United States Patent
Ludolph et al.

(10) Patent No.: US 6,239,798 B1
(45) Date of Patent: *May 29, 2001

(54) METHODS AND APPARATUS FOR A WINDOW ACCESS PANEL

(75) Inventors: Frank E. Ludolph, Menlo Park; George Tharakan, Sunnyvale, both of CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/085,456

(22) Filed: May 28, 1998

(51) Int. Cl.[7] ........................................ G06F 3/14
(52) U.S. Cl. ................. 345/340; 345/339; 345/348; 345/342; 345/357
(58) Field of Search ................... 345/342, 339, 345/348, 340, 357, 358

(56) References Cited

U.S. PATENT DOCUMENTS

| 5,072,412 | 12/1991 | Henderson, Jr. et al. . | |
|---|---|---|---|
| 5,233,687 | 8/1993 | Henderson, Jr. et al. . | |
| 5,394,521 | 2/1995 | Henderson, Jr. et al. . | |
| 5,488,686 | * 1/1996 | Murphy et al. | 345/357 |
| 5,533,183 | * 7/1996 | Henderson, Jr. et al. | 345/344 |
| 5,745,096 | 4/1998 | Ludolph et al. | 345/340 |
| 5,757,371 | * 5/1998 | Oran et al. | 345/348 |
| 5,825,348 | * 7/1998 | Ludolph et al. | 345/342 |
| 5,874,958 | * 2/1999 | Ludolph | 345/339 |
| 5,920,316 | * 7/1999 | Oran et al. | 345/348 |
| 5,923,326 | * 7/1999 | Bittinger et al. | 345/340 |

OTHER PUBLICATIONS

Henderson, Jr. et al., "Rooms: The Use of Multiple Virtual Workspaces to Reduce Space Contention in a Window–Based Graphical User Interface",ACM transactions on Graphics, vol. 5, No. 3, Jul. 1986, pp. 211–243.

* cited by examiner

Primary Examiner—Raymond J. Bayerl
Assistant Examiner—Thomas T Nguyen
(74) Attorney, Agent, or Firm—Finnegan, Henderson, Farabow, Garrett & Dunner, L.L.P.

(57) ABSTRACT

A system employs a sliding window panel that contains icons representing every task that has been opened into a window, regardless of the workspace in which it exists. A user may use the sliding window panel to launch, terminate, hide, or resize windows in the workspaces.

47 Claims, 8 Drawing Sheets

METHODS AND APPARATUS FOR A WINDOW ACCESS PANEL

BACKGROUND OF THE INVENTION

A. Field of the Invention

This invention relates generally to graphic user interfaces for computer systems and, more particularly, to methods and apparatus for providing a window access panel.

B. Description of the Related Art

Many modern computer systems employ graphic user interfaces that provide a separate "window" for each active task (as used herein, the term "task" includes both application programs and documents). Familiar examples include the Macintosh user interface from Apple Computer, Inc., and the Windows 95 user interface from Microsoft Corp. Such user interfaces facilitate computing because they provide a convenient way for a user to manage multiple tasks that are concurrently executing on the same computer.

Some user interfaces take this concept a step further by providing support for multiple workspaces. An example of such a user interface is the Unix Common Desktop Environment (CDE), which is based upon the Hewlett-Packard Visual User Environment. CDE was developed jointly by a group of companies including Sun Microsystems, Inc., Hewlett-Packard, and International Business Machines. A workspace is a collection of tasks that are employed to accomplish a specific objective. For example, a user may have one workspace for creating a newsletter and another for personal organization. The newsletter workspace may contain windows for numerous tasks, including word processing, drawing, and desktop publishing. Similarly, the personal organization workspace may contain windows for tasks that provide calendaring, scheduling, and addressing capabilities. A user of an interface that supports multiple workspaces can switch between those workspaces as needed, and the computer displays windows belonging to the selected workspace.

This capability of having multiple windows, while elegant in many respects, becomes somewhat cumbersome when the number of windows becomes large. Having numerous windows leads to a cluttered desktop appearance and makes it difficult for the user to locate a specific window corresponding to a task. As used herein, the term "task" may include software executing using a computer processor. Depending on the size of the display screen and on the task actively manipulated by the user, some of the windows may be completely visible while others may be partially visible or completely hidden.

Additional problems arise in user interfaces that support multiple workspaces. For example, a user may desire to display the same window in more than one workspace. In doing so, the user may desire to have a window in one workspace located at a different screen position, or sized differently than, the corresponding window in another workspace.

These problems have been addressed somewhat by others. For example, Microsoft has created a "Taskbar" for the Windows 95 operating system that typically resides at the bottom of the user's screen. A user may configure the Taskbar to reside out of view, normally, and to slide open when the mouse pointer touches the edge of the screen. Whenever a user launches a task, a window for that task is opened on the display (also referred to as a desktop), and a button for that task is added to the Taskbar. A Windows 95 user can choose to "hide" a task by selecting a button in the top right corner of the corresponding window. This causes the computer to remove the corresponding window from the desktop, but the button for the task remains in the Taskbar. The user can also "show" a previously hidden task by using a mouse to point at a button in the Taskbar and clicking the mouse button. This causes the computer to display the corresponding window on the desktop. The user can also "close" a task by selecting a button in the top right corner of the task's window. This causes the computer to terminate execution of the program, remove the corresponding window from the desktop, and remove the task's icon from the Taskbar.

Although the Taskbar provides significant window manipulation capabilities, it does not address the problem of window management in a user interface that supports multiple workspaces. This is primarily because Windows 95, itself, does not support multiple workspaces.

CDE provides a menu and dialog mechanism for managing window displays in multiple workspaces, but this mechanism has several deficiencies. For example, when a CDE user launches a task in a particular workspace, a corresponding window is opened in that workspace only. If the CDE user desires to view that particular window in another workspace, the user must remember which workspace contains the desired window, switch to that workspace, use a menu and dialog to specify the first workspace, and then switch back to the first workspace. Moreover, the window appears in the same screen position and at the same size in each workspace; any change in screen position or size in one workspace affects the screen position and size in all other workspaces.

There is therefore a need for a system that alleviates these problems and allows a user to easily select and manipulate windows in a user interface that supports multiple workspaces.

SUMMARY OF THE INVENTION

Systems and methods consistent with the present invention, as embodied and broadly described herein, manage the display of windows corresponding to tasks executable by a computer. Multiple workspaces are provided, each of which is capable of displaying multiple windows corresponding to executing tasks. A window panel may be displayed that includes icons corresponding to the executing tasks, and permits shared access to a window of the executing tasks upon selection of a corresponding icon displayed in the window panel.

In accordance with the invention, a computer-readable medium contains instructions for managing the display of windows corresponding to tasks executable by a computer. This is accomplished by providing multiple workspaces, each of which is capable of displaying multiple windows corresponding to executing tasks. A window panel may be displayed that includes icons corresponding to the executing tasks, and permits shared access to a window of the executing tasks upon selection of a corresponding icon displayed in the window panel.

In accordance with the invention, a system for managing windows in a user interface that supports multiple workspaces comprises a memory having program instructions, and a processor. The processor is configured to use the program instructions to providing multiple workspaces, each of which is capable of displaying multiple windows corresponding to executing tasks. The processor is also configured to display a window panel that includes icons corresponding to the executing tasks, and to permit shared access to a window of the executing tasks upon selection of a corresponding icon displayed in the window panel.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings.

DETAILED DESCRIPTION

Reference will now be made in detail to an implementation of the present invention as illustrated in the accompanying drawings. Wherever possible, the same reference numbers will be used throughout the drawings and the following description to refer to the same or like parts.

A. Overview

Systems and methods consistent with the present invention operate in a graphic user interface that supports multiple workspaces. The systems and methods employ a sliding window panel that contains icons representing every task opened into a window, regardless of the workspace in which it exists. Whenever a new task is opened into a window, an icon representing that task is added to the window panel.

A user may hide a window in one workspace, but that window remains visible in any other workspaces in which it existed. The computer retains an icon representing the hidden window in the window panel so that the window may be subsequently shown. Moreover, the computer stores the location and size of the window so that when it is subsequently shown, it may be displayed as it existed when it was hidden. Alternatively, a user may close a window that is no longer needed. The window is removed from every workspace in which it existed, and the corresponding icon is removed from the window panel.

A user may show a window by selecting its icon from the window panel. If that window is already open in the workspace but obscured by other windows in front of it, it is simply brought to the foreground of the display. If the window was hidden, it is restored in the workspace at the same position and at the same size as it existed before it was hidden. If the window has never been shown in the workspace, it is shown at a default location and size. A user may also reposition or resize a window in a workspace, without affecting the size or position of the corresponding window in another workspace.

B. Architecture

Figure 1:
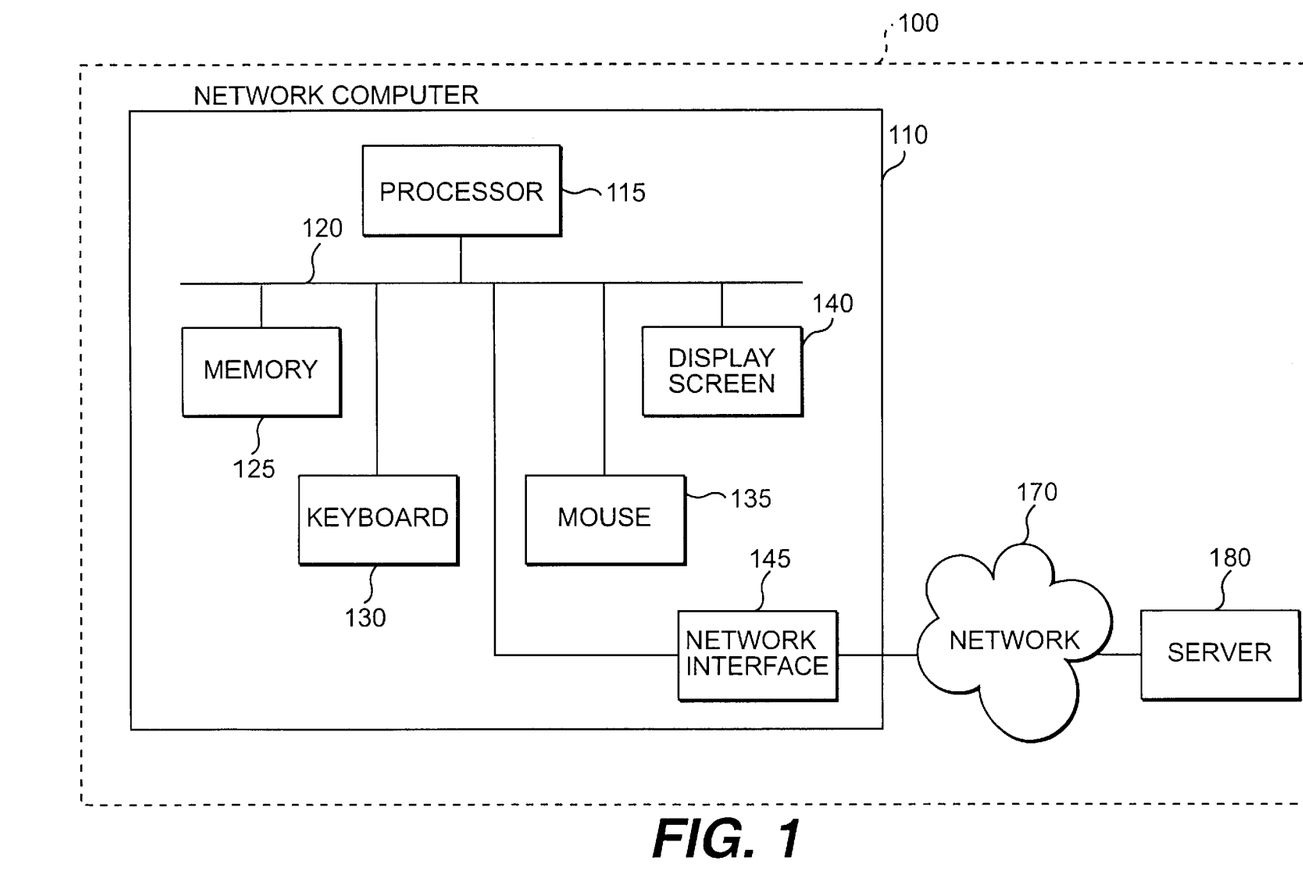
FIG. 1 is a block diagram of a computer system in which systems consistent with the present invention may be implemented.

FIG. 1 is a block diagram of a computer system 100 in which systems consistent with the present invention may be implemented. System 100 consists of a computer 110 connected to a server 180 via a network 170. Network 170 may be a local area network (LAN), a wide area network (WAN), or the Internet. In a preferred embodiment, computer 110 is a network computer. System 100 is suitable for use in the HotJava™ Views™ user environment, although one of skill in the art will recognize that methods and apparatus consistent with the present invention may be applied to other suitable user environments. HotJava Views is a graphical user interface developed by Sun Microsystems, Inc. for network computers. It is described, for example, in a document entitled Designing the HotJava Views™ User Environment For a Network Computer, Sun Microsystems, Inc. the contents of which are reproduced below.

Network Computers

The Network Computer (NC) represents a different approach to desktop computers. It is based on the Java Language and Web protocols, and has no permanent local storage. The operating system, applications, and data are centrally stored and loaded over the network as needed. Unlike terminals connected to a shared central computer, however, much of the application processing takes place on the local NC client, and therefore NCs do not have the scaling problems of X-Terminals where all the processing occurs on the central computer and bulky screen-display commands tend to clog the network. The arrival of the NC gives us a chance to rethink the basic design of computer applications.

The great promise of Network Computers is that they will reduce the burden of system administration and lower system support costs for large networks of client systems. Because all programs and data are centrally stored, updating software and backing up user files is a simple matter for the support staff. And if one of the NCs should have a hardware failure, it can simply be unplugged and replaced by a spare machine. Turning on the power switch is the only operation required to install new versions of the software on the client NC—the same procedure used every morning when these machines are turned on, because they do not have any permanent storage.

Another important advantage of NCs is that, because all the data is centrally stored on networked servers, it makes no difference which client machine a user logs in from. The user can access their data, programs, and normal environment from any machine that can connect to the network.

Although the central storage of programs and data has many important advantages, it also places serious constraints on NCs. In particular, all information on the client NC is lost every time the power is turned off, so the operating system, applications, and data must be downloaded from the network the first time they are needed after the power is turned on. Thus, an NC would probably not be a good choice for someone who needs a complex operating system for a variety of large applications, or large data files, such as a graphic designer.

User Environment for NCs

Sun Microsystems is producing an NC based on the Java language and JavaOS. The prototype machines were shipped with only the operating system and the HotJava Browser, with the intention that customers would create their business applications as Web-based applications running in the browser. But many potential customers also expressed an interest in a set of simple applications for employee communication and coordination. A group of human interface designers at Sun were asked to develop such a set of simple applications. That project has evolved into a product called HotJava Views, and the design of the human interface for HotJava Views is described below.

The HotJava Views Webtop user environment includes:

Selector—An intuitive "push-button" GUI

Mailview—Electronic mail

Calendar View—Electronic calendar

NameView—A directory of people in organization

InfoView—A Web browser for viewing intranet documents and (optionally) Internet documents The Transaction Worker The target users for HotJava Views are what we refer to as "transaction workers." Examples of transaction workers are order takers for a mail-order catalog business or customer support personnel at a bank's telephone call center. They use computers for a limited set of activities. Their primary-task applications were developed by an in-house MIS department or $3^{rd}$ party developer, and typically access records in a central database. In addition to their primary tasks, transaction workers are also members of the organization, and need to communicate with other workers and management, attend meetings, and access company documents such as benefit plans and policy manuals. Currently these transaction workers are using 3270 terminals or PCS connected to a mainframe computer, but they have been identified by customer organizations as candidates for NCs, which can offer more functionality than terminals and simpler client administration than PCS.

Design Principles

The HotJava Views webtop user environment is based on a set of general design principles. Although we group these principles together in this paper, in fact they evolved in the course of designing the individual applications. Some principles were declared in advance; others were noticed only after they had been around for some time. As we recognized emerging principles during the design process, they were fed back to structure the overall design.

Switched Screens

Early on, we knew we would have a small, fixed set of applications for the first release.

We would provide mail, calendar, a directory of people, and a Web browser. There would also be a small set of applications for the user's primary tasks, developed in-house by the customer's MIS department. We needed a way for the user to access the applications and decided to simplify the model by letting the user view only one application at a time.

We were inspired by the 3270 terminal applications that our transaction workers often use now. These terminal applications usually have one function per screen and the users can quickly switch between screens when they want to access the different functions. By assigning each application (mail, calendar, etc.) to a separate screen and letting the use switch between screens, we could give the user easy access to the functions they needed without the clutter of overlapping applications windows. We considered a model based on tabbed cards, but tabs with text labels look best at the top of the screen and vertical space was at a greater premium than horizontal space on an NC monitor. Instead, we quickly settled on Selector, a switch containing a column of graphic icons along the left side, one for each screen. The user clicks on an icon to switch between screens. The state of a screen is saved when it is switched out and restored when it is switched back in. Because these applications are effectively always running, the user does not have to be concerned with starting and stopping applications.

The user switches between different application screens by clicking on one of the icons in the Selector along the left side of the screen. The current mail message contains a calendar appointment as an attachment. Clicking on the button under the pointer will schedule the appointment in the user's calendar.

Keep it Simple

Another early decision was to simplify the typical PC applications. We had several motivations. First, today's PC applications have generally become so loaded with features that many people use only a small portion of their functionality. In particular, our users would be focused primarily on their "transaction applications" and they would not need all the "power user" functions in applications such as electronic mail. Second, simpler applications would have reduced user training costs. Finally, to improve response time and reduce network traffic, the applications should be small enough to fit easily in the low memory size of an NC.

Our first attempt to simplify applications focused on electronic mail. We started with the mail program from the UNIX Common Desktop environment (CDE) and made a list of all its functions. We eliminated any function, preference or control that did not seem essential to the modest use of electronic mail that we expected from our target users, the transaction workers. We ended up throwing out about half of the functions in CDE mail and very few of those have crept back in as the design matured.

For example, we eliminated a whole set of functions for moving and copying messages to mailboxes, opening and closing mailboxes, and creating new mailboxes. Instead, because we expect transaction workers will be light users of email, we provided them with just a single folder for storing messages that they want to save and another folder where copies of outgoing messages are automatically saved. We also provided a set of commands for sorting and searching these mail folders, which could become moderately large. The net effect was that 21 mailbox-related commands in CDE mail were reduced to 7 commands in MailView. Similar reductions were made to other areas of functionality.

Our early decision to eliminate mail attachments was more problematical. Our users would not have access to a file system or to the typical PC applications needed to view attachments thus, we reasoned that mail attachments would be of limited use and they were excluded from early designs. However, feedback from customers, along with the realization that our users would be getting mail that might contain attachments from users of other email systems, led us to build in limited support for mail attachments. Our users can view and print some types of attachments in email from others, and they can also create new messages with calendar appointments and live URL links as attachments.

We are big fans of placing the most commonly used functions on a button bar where they are visible and can be more easily accessed than through the menus, but again we wanted a simple button bar, not a vast button cafeteria. So our next step was to try to fit our most important functions onto the button bar. To our surprise, we had done such a thorough job at reducing non-critical functions, that all the remaining functions fit on a single button bar. Buttons on the button bar are identified only by a graphic, but if the user's pointer lingers over a button for more than a fraction of a second, a text label appears below the button to describe its function.

No Menus

Having placed all the functions on the button bar, we were suddenly confronted with the unthinkable: If all the functions fit on the button bar, did we need menus at all? The pull-down menus of a typical GUI application arrange the application's functions into a hierarchy. Counting the menu names as one level, this hierarchy is often three and occasionally four levels deep. Menus allow the user to access a large number of functions without permanently dedicating screen real estate for each of the functions. This advantage was especially important in computers with small screens. The negative aspect of menus is that the list of functions is hidden most of the time and it can be difficult or tedious to manipulate the menus. As typical computer screens have become larger, more and more of the menu functionality has been duplicated in tool bars, palettes, floating windows, and modeless dialogs, which keep the functions conveniently at hand. By eliminating menus and putting all the functionality directly in the main interface, we keep the functionality visible and easy to access.

Having ruthlessly simplified the mail application and eliminated menus, we were eager to know whether this approach would work with our other applications. When examining the CDE calendar, however, we did not find a large number of functions in the application menus that could easily be eliminated. So it was clear that the remaining menu functions would not fit into a reasonable button bar. Instead we took a different approach to simplification, and converted some of the menu operations into direct manipulation operations in the screen display. In the CDE calendar, the user is provided with both graphical and textual views of their weekly appointments, and they use a separate dialog to create, edit or delete an appointment. We chose to combine all the information into a single graphical view of the week's appointments that could be directly edited. In the Calender-View screen, new appointments are created by clicking at the desired time and typing in text for the appointment. The user can then change the times by dragging the top and bottom borders of an appointment. Appointments containing an envelope icon have an associated email message. Many of the functions that had been available from the menus were thus converted into direct manipulation of the appointment's graphical representation on the calendar.

Another technique that we used was to move functions from the main application menus to a place associated with their use. For example, both the CDE calendar and CalendarView provide a list of other people's calendars that you can also view. In CDE, both the list of other people and the facility for editing that list were in the main application menus. In HotJava Views we put the name of the calendar's owner at the upper left of the calendar and made it an option button, so that clicking on the button offers a choice of other people's calendars. The last item on the option list lets the user edit the list. This is another example of simplifying the interface by moving functionality from the main application menus to a place where it is more directly relevant.

The net result of these simplifications was that we were able to eliminate application menus from the calendar screen. In fact, there are no application menus in any of the HotJava Views applications.

Application Integration

Although our applications are simpler than typical PC applications, we wanted to improve the usability of the system by tightly integrating the applications so that they could easily be used together. At first we planned to use drag-and-drop as the primary technique for application integration. For example, an address from the NameView could be dragged and dropped onto the "To:" field of an email message. We soon realized, however, that there were several serious problems with drag-and-drop in our environment. First, how could we drag objects from one application to another, when only one application was displayed at a time? Second, many people find drag-and-drop difficult or slow, so in any event we would need to provide an alternative for keyboard-only operation. Such alternatives are normally made available from the menus, which we wanted to eliminate.

With drag-and-drop no longer a contender as the mechanism for application integration, we looked into the possibility of using buttons in the button bar. But what should happen when the user pressed such a button? We considered having the button switch to the other application, but that seemed disruptive. We also considered having the button bring up the other application in a window above the current application, but that violated our "rule" about having only one application visible at a time and led us down the path toward the standard overlapping window model. Finally, we developed a model in which a button in one application could display a "reduced version" of another application while keeping the focus centered in the current screen, and this turned out to be a very productive approach. We will explain the mechanism with an example.

Our user has received an email message announcing an upcoming meeting, and the message contains a calendar appointment as an attachment. The appointment attachment appears as an icon in the upper right corner of the message. When the user clicks the "Schedule appointment in Calendar" button in the button bar, a reduced version of the CalendarView application is displayed in a window in front of the mail screen. The reduced calendar shows the day of the appointment, with the new appointment scheduled and selected. The standard facilities for editing, printing, or deleting the appointment are available, but many of the other calendar functions are missing in this reduced application. For example, it is not possible to change to a month view or go to another day.

Although the window may appear to be similar to the standard overlapping windows of today's GUI interfaces, it is fundamentally different. The main application screen always remains as the background and cannot be resized. The reduced application window, the calender window, can be moved and resized, but always floats in front of the main application screen. The user can move the keyboard focus between the window and the screen, interact with the controls in either place, and even open additional reduced application windows, but the reduced application window always remains in front of the main application screen. Although the reduced application window is non-modal and can be moved out of the way, the user will typically treat it as a dialog. For example, when the user schedules an appointment from the MailView screen, the reduced calendar window is posted just for confirmation, and we expect the user to close the window almost immediately.

If the user later switches to the CalendarView application, they will see the new appointment with a small mail icon in the lower right corner of the appointment. The mail icon serves as a reminder that this appointment was scheduled from the mail application and provides another example of application integration. If the user wishes to see the original message, perhaps to get more information about the meting they can click on the mail icon and the original message is displayed in a reduced mail application window in front of the CalendarView.

Accessing Information

In addition to CalendarView and MailView, HotJava Views includes InfoView. InfoView is an HTML browser intended primarily for viewing internal documents over the intranet. The Home Page button on InfoView will normally be configured to take the user to an index page for the organization's online manuals and documentation, and thus provide access to company information such as: policy, benefits, resources, and news.

The version of InfoView does not allow the user to type in arbitrary URLs, the user can only view pages that are accessible directly or indirectly from the Home Page or from one of the bookmarked pages. It is a simple matter, however, to configure InfoView so that it has a URL type-in field. As a further choice, customers also have the option of installing the standard HotJava Browser as an applet in the Selector in place of InfoView.

InfoView of course is Java enabled, so it can be used to present Web-based applications that contain Java applets. This facility provides a convenient way to give the user access to a variety of applications without putting them on the Selector. A button on the browser also allows the user to create a mail message that contains a live URL for the current page as an attachment.

There is also a reduced version of InfoView that appears in a window in conjunction with other applications. For example, it is used to view Web links included in a mail message, and to display the online Help.

Accessing People

NameView, provides an easy way to find people and related information. In addition to the usual name, address and phone number, NameView includes a network address for mail, calendar and the Web. Thus, after finding a person in NameView, a button click allows the user to send them mail, view their calendar, or browse their home page.

NameView is tightly integrated with the other HotJava Views applications. For example, a "reduced" NameView window can be used in MailView to address email messages, or in CalendarView to add someone to the list of calendars the user can browse.

Configuring the System

HotJava Views is highly configurable by the customer's system administrator. In addition to the applications described above, the Selector can be easily customized to contain one or more applications, such an order entry application, targeted at the user's primary job function. The Selector can expand to additional columns if needed to accommodate all the desired application icons.

The actual set of applications installed on the Selector, as well as many other aspects of the environment, can be specified for individual users or groups of users by the system administrator. And because Network Computers do not store data locally, the user is able to log in from any machine on the network and access their normal environment. The individual HotJava Views application can also be customized by the system administrator through the use of property files. For example, the default hours shown in the CalendarView screen are determined by the properties file, so that the initial calendar view can be set appropriately for workers on different shifts. Similarly, the properties file determines whether or not the InfoView application displays a field for entering arbitrary URLs.

Passing of the Old Order

Having given a flavor of the interface for our applications, we'll now describe the basic principles that we've followed and how they differ from the principles found in typical PC graphical user interfaces. First, we will discuss some common principles that we are not using.

The Desktop Metaphor

The desktop metaphor, with its overlapping windows, folders, documents and trash can, has been the basis for most graphical computer interfaces. Review of this article will show that the desktop metaphor has been banished. The static desktop has been replaced by active objects. Only one application screen is visible at a time. Views replace each other, rather than appearing as overlapping pieces of paper on a desktop. Although reduced application windows can overlap the main application screen and each other, they are temporary, second-class citizens in this world.

Our user never interacts with documents, folders, filing cabinets, or trash cans on the NC screen. One of our strategies for simplifying the interface is to minimize metaphors with objects in the physical world and develop models that are closely attuned to the computer-based activity. Basing the interface on a metaphor to a different realm always has a tendency to bring along irrelevant baggage.

Distinction Between Application and Document PC applications make a strong distinction between applications and documents, analogous to the computer science distinction between program and data. Users can separately manipulate applications and documents, for example with a file manager. The basic components of HotJava Views, however, are more like computer science "objects" with intertwined methods and data. Our applications act as viewers onto the data, and our users never interact with applications and documents separately. For example, they never see a CalendarView application that is not viewing someone's appointments, and they never encounter a calendar data file outside of the CalendarView application.

File System and File Manager

The lack of a distinction between applications and documents is closely related to the lack of a file system representation and a file manager in our interface. HotJava Views is essentially a set of information appliances that provide the only way to view data. The user deals with information objects, such as email messages or calendar appointments, rather than with files. Under the surface, these information objects may be represented as files or a database records on the central server, but that is of no concern to the user. The only file manager-like functionality that our users need is a way to choose among a relatively small, fixed set of application screens, and this is provided by the Selector on the left side of the screen. The installation and administration of the applications and data files is handled on the central server by a system administrator. The end user does not have to deal with file systems.

Double-Click to Open

The basic interaction model in PC graphical interfaces is to click on the icon representing an object to select it, and then choose an action on the selected object from a menu. Frequent use of menus can be a hassle and therefore a shortcut was added to the model: single-click to select, double-click to select and perform the default action. For most objects, such as documents, the default action is to open or view the object, and thus double-clicking on the object usually selects it and opens it.

In part because we do not distinguish between applications and documents, our users generally do not have a variety of operations that they could meaningfully perform on HotJava Views objects without first viewing them. Therefore we have yoked selection to viewing. Single-clicking an object selects it and displays it.

A New Approach

Our early decision to switch between single-application screens and our desire for simple, tightly integrated applications, led naturally to an interaction model that is somewhat different from the model for the typical PC application.

Single-Click, Single-Selection

Our basic model is that a single-click selects an object and displays it in the Selector, a single-click on one of the icons in the Selector on the left displays the corresponding object in the remainder of the screen. The selection is indicated by a rectangular border around the selected icon. Within the Active Mail folder, a message header is selected from a scrolling list and the body of the message is shown in the lower part of the display.

We allow only single selection from collections of objects. In most cases that is the only reasonable choice. Selecting more than one application in the Selector or more than one mailbox within the mail screen would not fit with our overall model of a single main application screen. In some cases, multiple selection might be reasonable. For example, the user might want to select several message headers and delete the messages with a single operation. We explored using multiple selection in these cases. However, in the interests of keeping the model simple and consistent, we have decided to restrict ourselves to single selection.

Web Look and Feel

You might have noticed that the graphic design in HotJava Views is somewhat reminiscent of the World Wide Web. This is intentional. We have tried to move away from the hardware look of contemporary graphical interfaces, in which the excessive use of borders and bevels has often resulted in a "boxy," visually noisy style. Instead, the Selector uses drop shadows without borders to achieve a floating three dimensional effect; we experimented both with shifting the graphics and reducing their shadows in order to achieve the "depressed" feel when the mouse button is down. Elsewhere, button bar graphics are angled and bleed to the edge of single-pixel borders. This downplays the repeating rectangle effect of bevel, white space, and icon border, and increases the space available for detail in the graphics without enlarging the size of the buttons. Throughout the interface, selected objects are marked by an enclosing border rather than a "depressed button" look.

The single-click model described earlier also fits with the feel of Web documents. We expect that our users will spend a significant portion of their time interacting with Web documents on the intranet. We didn't want to present them with one interaction style while they are using the browser and another interaction style while they are using other applications.

Button Integration

Our general interaction model is that the user selects an object to view it, and then has the option of clicking one of the buttons on the button bar for further operations on the selected object. Clicking a button to relate information to another application becomes a simple extension of this model. HotJava Views is written using, and manipulates the user interface via, the Java™ programming language. The Java programming language is described for example, in a text entitled "The Java Language Specification" by Janes Gosling, Bill Joy, and Guy Steele, Addison-Wesley, 1996, which is hereby incorporated by reference. Sun, Sun Microsystems, JavaSoft, the Sun Logo, Java, and HotJava Views are trademarks or registered trademarks of Sun Microsystems, Inc. in the United States and other countries.

Network computer 110, comprises several components that are all interconnected via a system bus 120. Bus 120 is, for example, a bi-directional system bus connecting the components of network computer 110, and contains thirty-two address lines for addressing a memory 125 and a thirty-two bit data bus for transferring data among the components. Alternatively, multiplex data/address lines may be used instead of separate data and address lines.

Network computer 110 contains a processor 115 connected to a memory 125. Processor 115 may be microprocessor manufactured by Motorola, such as the 680X0 processor or a processor manufactured by Intel, such as the 80X86, or Pentium processor, or a SPARC™ microprocessor from Sun Microsystems, Inc. However, any other suitable microprocessor or micro-, mini-, or mainframe computer, may be utilized. Memory 125 may include a RAM, a ROM, a video memory, and mass storage. The mass storage may include both fixed and removable media (e.g., magnetic, optical, or magnetic optical storage systems or other available mass storage technology).

The user typically inputs information to network computer 110 via a keyboard 130 and a pointing device, such as a mouse 135, although other input devices may be used. In return, information is conveyed to the user via display screen 140.

Computer 110 communicates with other computers on network 170 via a network interface 145, examples of which include Ethernet or dial-up telephone connections. Accordingly, computer 110 sends messages and receives data, including program code, through network 170. In accordance with the invention, one such downloaded task is the user environment application program described herein. The received code may be executed by processor 115 as it is received, and/or stored in memory 125 for later execution. Application code may be embodied in any form of computer program medium. The computer systems described herein are for purposes of example only. An embodiment of the invention may be implemented in any type of computer system or programming or processing environment.

The operating system, tasks, and data required by network computer 110 are centrally stored at server 180, and are loaded over network 170 as needed. When network computer 110 is first turned on, server 180 provides it with a boot image that includes the operating system, such as JavaOS 1.0, developed by Sun Microsystems, Inc. Server 180 also provides to network computer 110 the HotJava Views user interface. This user interface supports multiple workspaces, such as, for example: an electronic mail workspace, an electronic calendar workspace, a workspace containing a directory of people in the organization, and a web browser workspace for viewing documents on an intranet or on the Internet. The actual set of tasks installed, and correspondingly, the workspaces available, can vary depending on how the system is configured by a systems administrator.

Figure 2A:
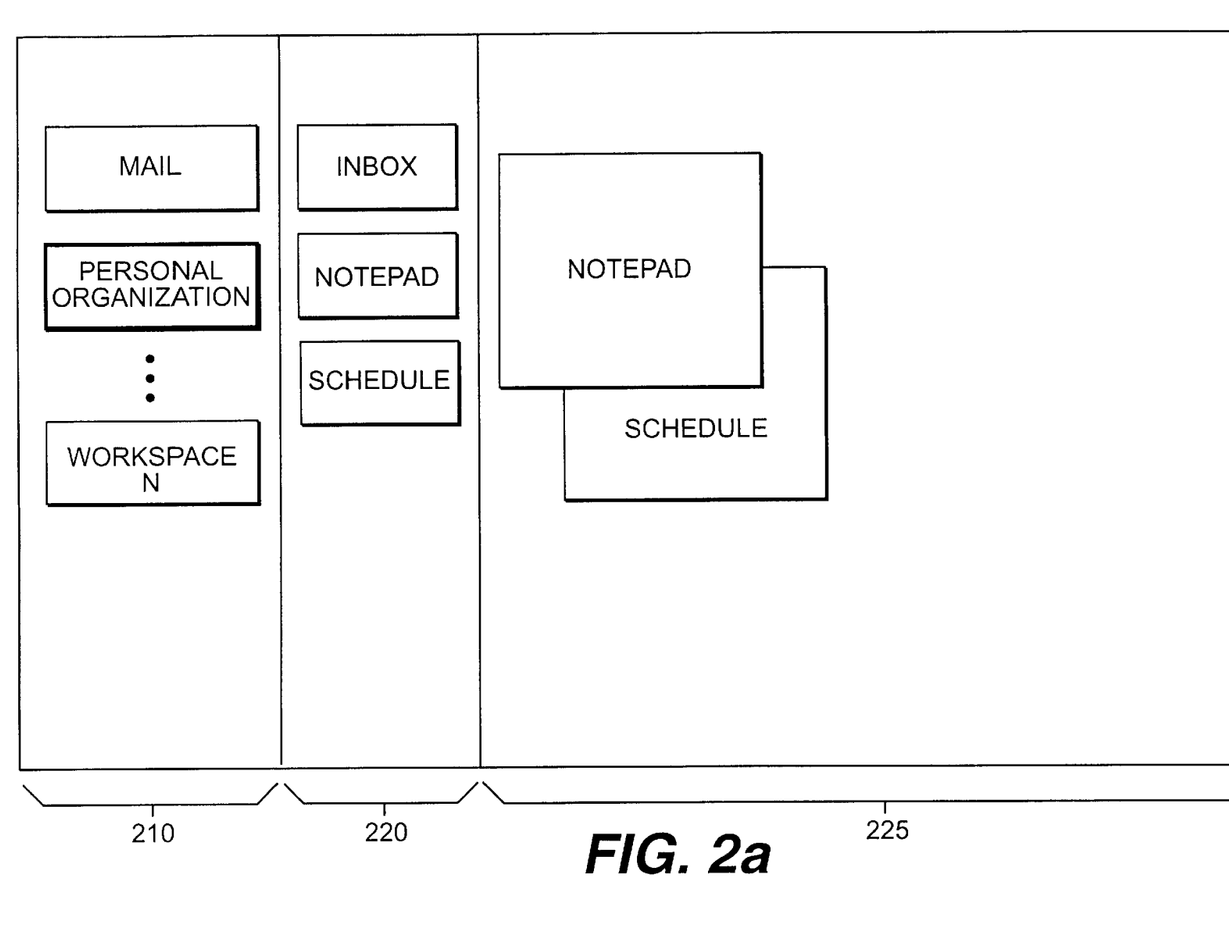
FIG. 2a is a representative user interface screen showing a workspace consistent with the present invention.

FIG. 2a is a representative user interface screen showing a workspace consistent with the present invention. FIG. 2a shows a selector 210, which is a vertical column on the left side of the screen that contains an icon corresponding to each workspace. Selector 210 functions as a workspace switch that allows the user to switch between the different workspaces. The user selects a workspace by clicking on one of the icons in selector 210. In response, computer 110 displays the windows contained in that workspace.

Selector 210 is created by a user environment (UE) application program that is part of HotJava Views and is provided to network computer 110 by server 180 during startup. The UE application program is responsible for creating and managing the graphical user interface used in HotJava Views. For example, the UE application program maintains in memory 125 an internal data structure that records which windows have been opened in which workspaces, along with their current location and size.

In FIG. 2a, selector 210 contains icons corresponding to multiple workspaces including Mail, Personal Organization, and other workspaces such as Workspace N. The Personal Organization workspace is active, as represented by the bold box surrounding its icon in selector 210, and is displayed in screen area 225. The Personal Organization workspace contains two windows: one corresponding to a Notepad task (which may allow the user to create and store short messages), and one corresponding to a Schedule task (which may show activities for a particular day, week or month).

The user interface also contains a sliding window panel 220 that contains an icon for every window in every workspace, whether visible or hidden. As a default, this icon list is presented vertically in alphabetical order, but the user may rearrange the ordering of the icon list if desired. As shown in FIG. 2a, window panel 220 contains icons for three windows: Inbox, Notepad, and Schedule. Window panel 220 contains icons corresponding to all three windows, even though only two windows are displayed in the selected workspace.

In one embodiment, window panel 220 is placed adjacent to selector 210. To minimize cluttering the user interface, window panel 220 is normally hidden. When hidden, its existence is indicated to the user by a thin, vertical strip along the left edge of screen 140. The user can open window panel 220 by moving the pointer to the left edge of screen 140. This causes window panel 220 to slide out from under selector 210 into the position shown in FIG. 2a.

Figure 2B:
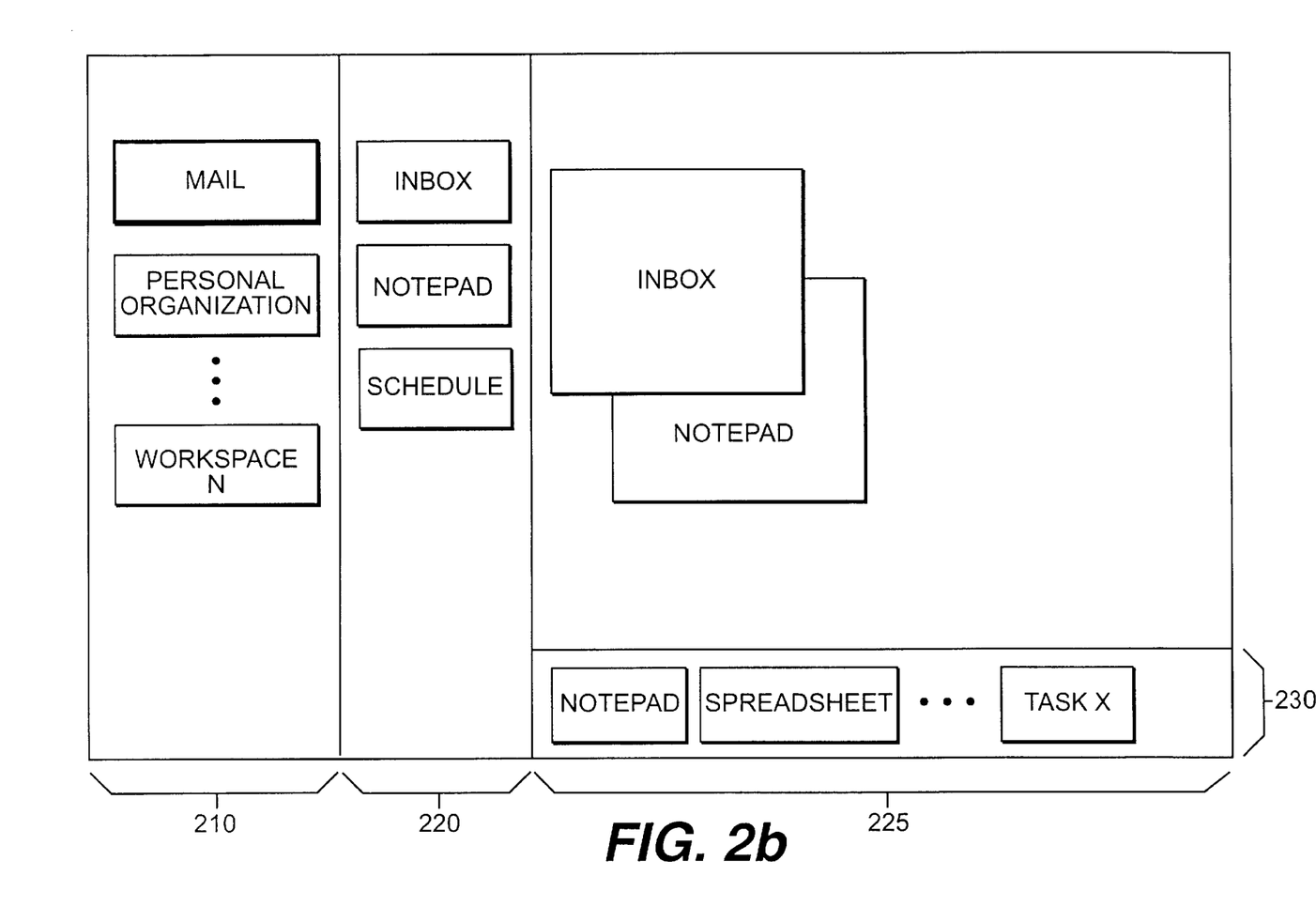
FIG. 2b is a representative user interface screen showing another workspace consistent with the present invention.

FIG. 2b is a representative user interface screen showing another workspace consistent with the present invention; the screen shown in FIG. 2b corresponds to the screen shown in FIG. 2a. In FIG. 2b, the Mail workspace is active, as represented by the bold box surrounding its icon in selector 210, and is displayed in screen area 225. The Mail workspace contains two windows: one corresponding to an Inbox task (which may show incoming electronic mail messages), and one corresponding to the Notepad task shown in FIG. 2a. Again, window panel 220 contains icons corresponding to all three windows, even though only two windows are displayed in the selected workspace.

FIG. 2b also shows a drawer 230, which contains icons corresponding to tasks that can be launched. Drawer 230 contains icons corresponding to tasks such as Notepad, Spreadsheet and others such as Task X.

C. Architectural Operation

For purposes of explanation, the following description is based on the screen displays shown in FIGS. 2a and 2b. Those of skill in the art will recognize that the combinations shown herein are exemplary only.

Figure 3:
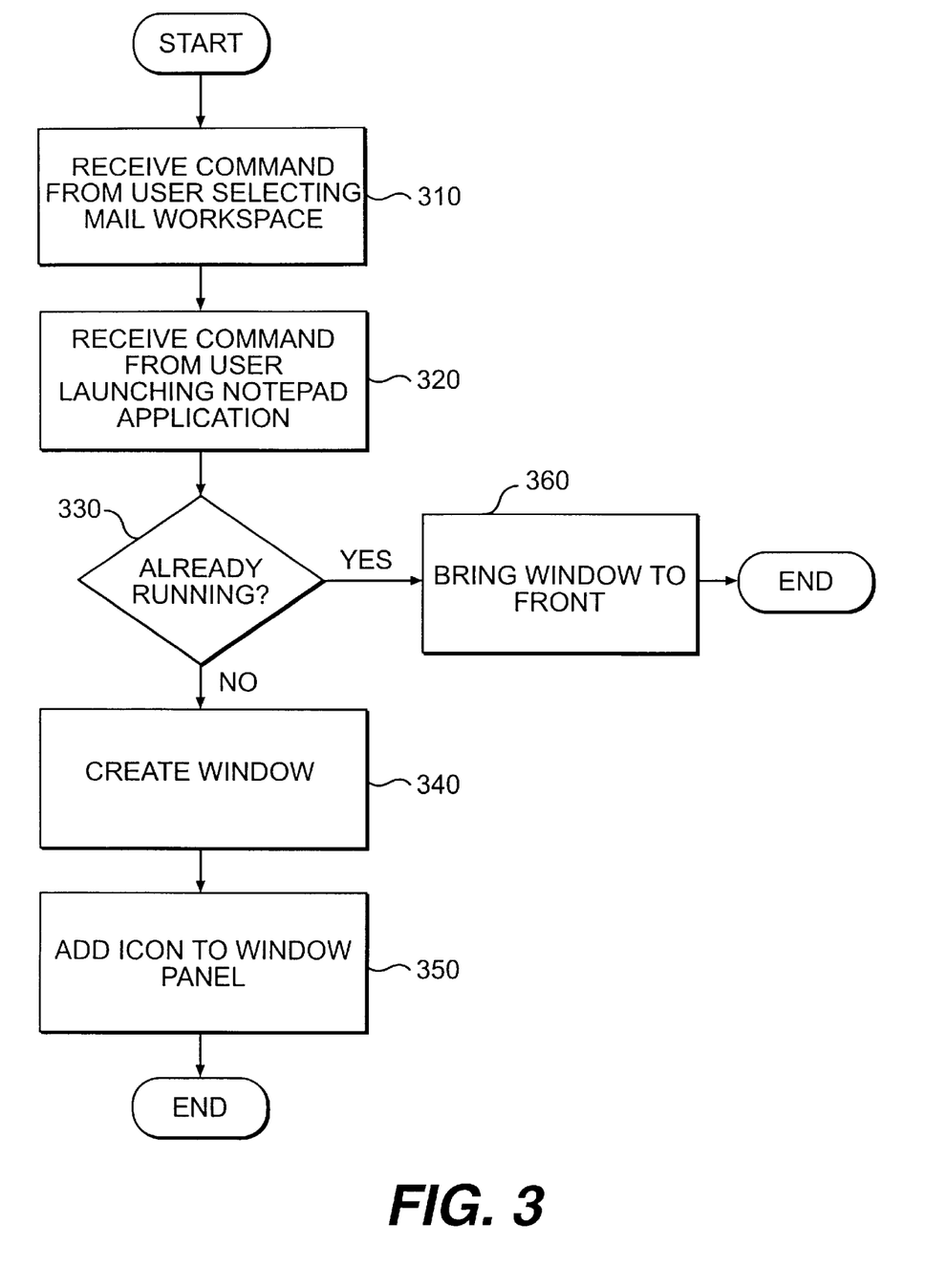
FIG. 3 is a flow diagram of operations performed to launch a task consistent with the present invention.

FIG. 3 is a flow diagram of operations performed to launch the Notepad task shown in FIG. 2b in a manner consistent with the present invention. The process begins when system 100 receives a command from the user selecting the Mail workspace (step 310) by clicking on its icon in selector 210. After the Mail workspace has been selected, system 100 receives a command from the user to launch the Notepad task (step 320). In one embodiment, the user does so by using mouse 135 to move the pointer to the bottom of the screen; this opens drawer 230, which contains icons for various tasks that may be launched. The user points to the icon corresponding to Notepad and clicks the mouse button to launch the task.

In response to the user's command to launch the Notepad task, processor 115 checks to determine whether the Notepad task is already displayed in a window in the Mail workspace (step 330). If so (as in this example), processor 115 causes the corresponding window to be brought to the foreground of the display (step 360), and the procedure ends. If the Notepad task had not already been displayed in a window in the Mail workspace, processor 115 would cause a window containing the Notepad task to be created and shown on display screen 140 (step 340). In addition, processor 115 would cause an icon to be added to window panel 220, corresponding to the Notepad task that was just launched (step 350).

Figure 4:
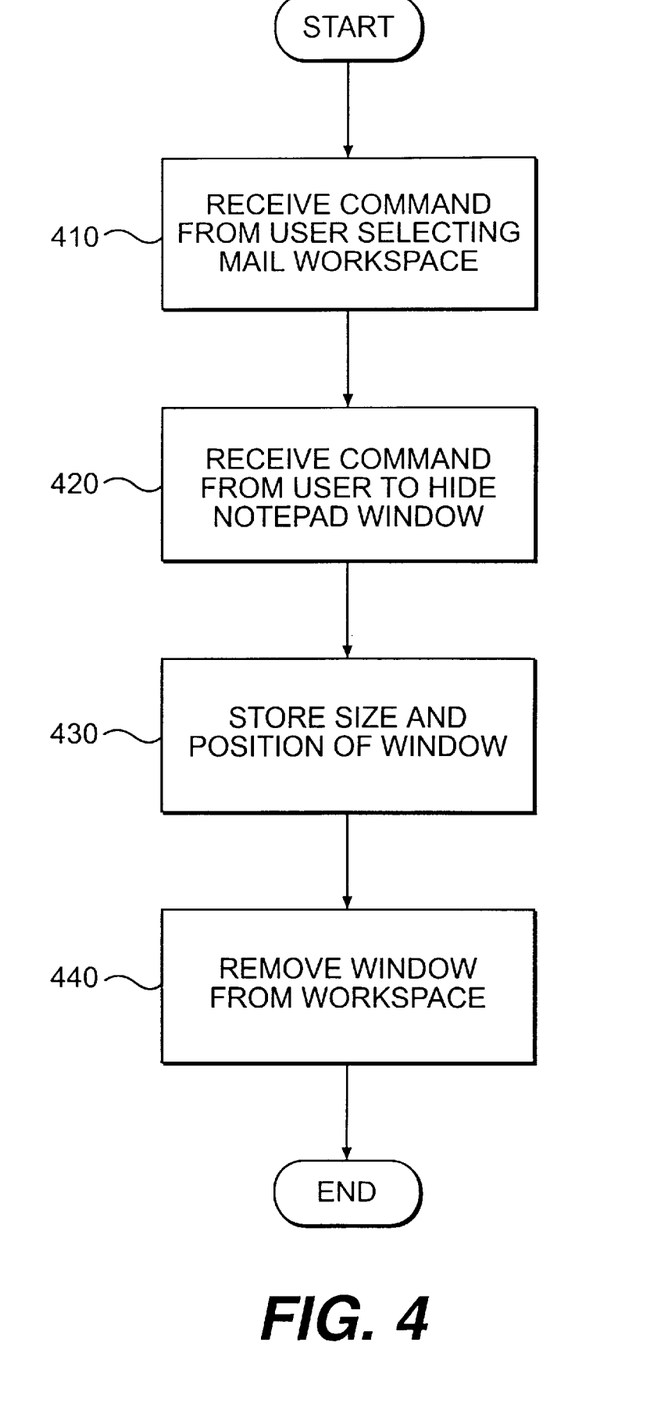
FIG. 4 is a flow diagram of operations performed to hide a window consistent with the present invention.

FIG. 4 is a flow diagram of operations performed to hide the Notepad window in the Mail workspace, and assumes that the Notepad window is displayed in both the Mail and Personal Organization workspaces. The procedure begins when system 100 receives a command from the user selecting the Mail workspace, which may be done by using selector 210 (step 410). In response, processor 115 displays on screen 140 all windows shown in that workspace. System 100 then receives a command from the user that indicates that the user wishes to hide the Notepad window (step 420); this may be accomplished by having the user click on a designated button in the frame of the Notepad window. In response to this command, processor 115 stores the size and position of the Notepad window in memory 125 (step 430). This is done so that if the user subsequently desires to view the window, it can be displayed at the same position and at the same size as it previously existed in the workspace. Finally, processor 115 causes the Notepad window to be removed from the display of the Mail workspace (step 440).

Importantly, although the window is hidden in the Mail workspace, any corresponding version of the window that is open in another workspace (such as in the Personal Organization workspace shown in FIG. 2a) remains visible in that workspace. Moreover, although the Notepad window is hidden in the current workspace, the icon representing that window remains in window panel 220. This is necessary so that the user can later show the Notepad window in the Mail workspace by using window panel 220.

Figure 5:
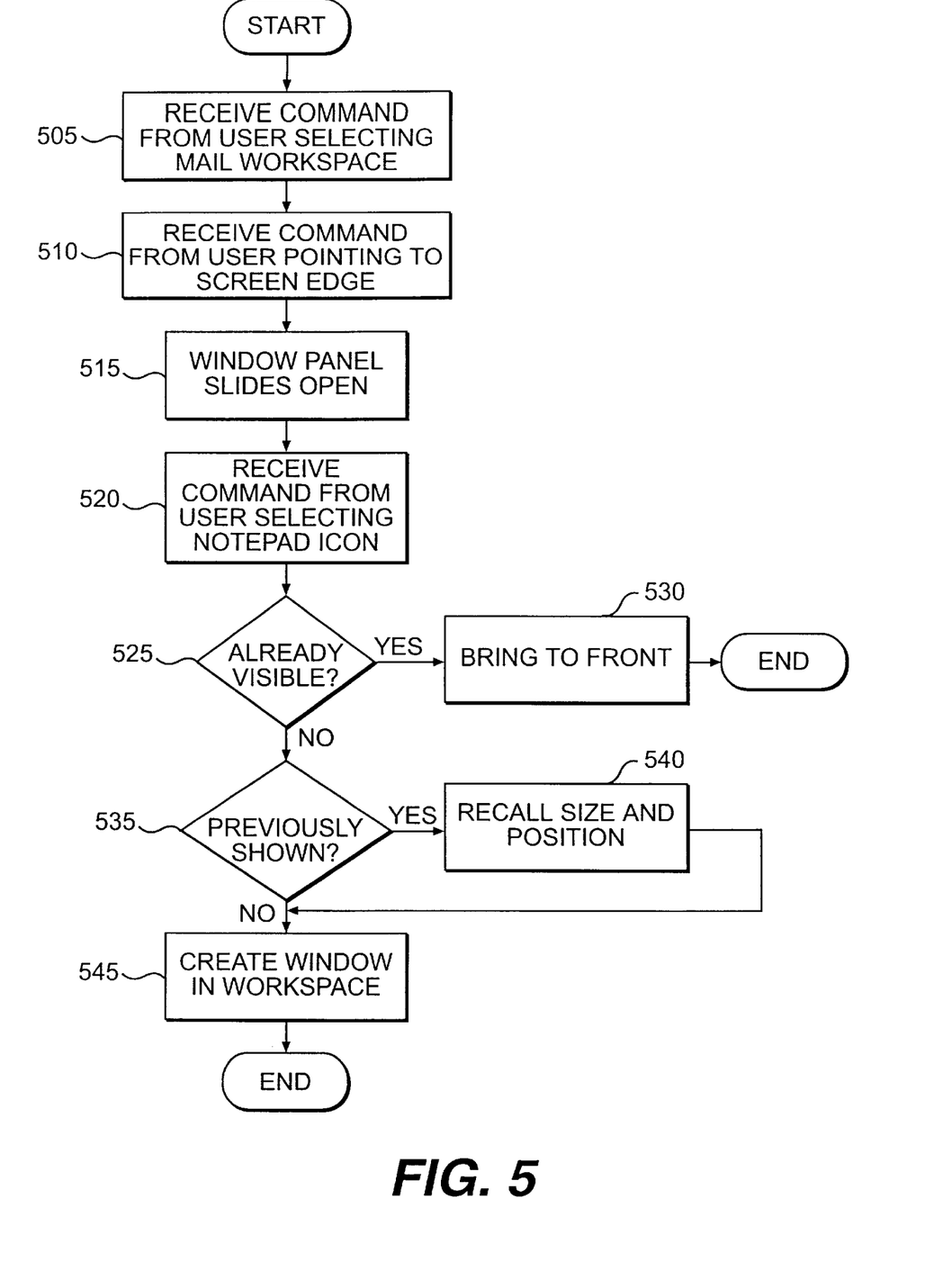
FIG. 5 is a flow diagram of operations performed to show a hidden window consistent with the present invention.

FIG. 5 is a flow diagram of operations performed to show a hidden or obscured window, and assumes that the Notepad window is hidden in both the Mail and Personal Organization workspaces. The procedure begins when system 100 receives a command from the user selecting a workspace, which may be done by using selector 210 (step 505). For example, the user may select the Mail workspace. System 100 then receives a command from the user to access window panel 220, which may be accomplished by the user pointing to the left edge of screen 140 (step 510). In response to the user's pointing, window panel 220 slides open next to selector 210 (step 515).

Once window panel 220 is displayed, system 100 receives a command from the user to display the window; the user may issue this command by using mouse 135 to click on an icon representing the Notepad window (step 520). In response, processor 115 first checks to determine whether the Notepad window is already being displayed in the current workspace (step 525). If it is, processor 115 causes the Notepad window to be moved to the foreground of display 140 (step 530). This allows the user to bring to the foreground a window that already exists in the current workspace, but has been obscured or hidden by other windows.

If the selected window is not already displayed in the current workspace (as in this example), processor 115 checks to determine whether the selected window has previously been displayed in the current workspace (step 535). If so, processor 115 recalls from memory 125 the size and position of the window as it was previously displayed (step 540). If not, a default size and position are used for the window. Next, processor 115 causes the Notepad window to be displayed in the Mail workspace (step 545), using either stored or default parameters. Importantly, although the window may be displayed in the Mail workspace, it does not affect the display (or lack thereof) of a corresponding window in another workspace, such as the Personal Organization workspace.

Figure 6:
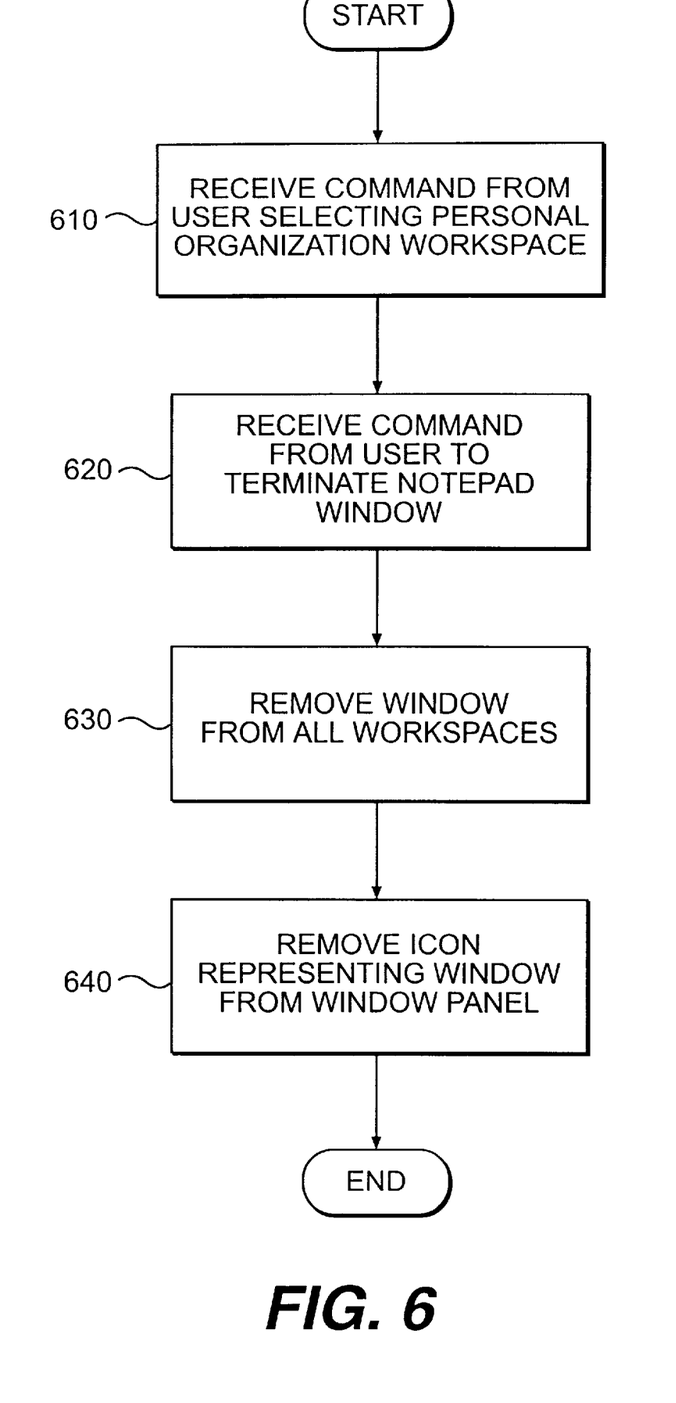
FIG. 6 is a flow diagram of operations performed to close a window consistent with the present invention.

FIG. 6 is a flow diagram of operations performed to terminate the Notepad window from the Personal Organization workspace, and assumes that the Notepad window is displayed in both the Mail and Personal Organization workspaces. The procedure begins when system 100 receives a command from the user selecting the Personal Organization workspace (step 610). If the Personal Organization workspace did not contain the window, an appropriate workspace could be selected by using selector 210. System 100 then receives a command from the user to terminate the Notepad window (step 620); the user may issue this command by clicking on a designated button on the Notepad window. Alternatively, the user may terminate a window directly from window panel 220 by pointing at the icon representing that window and using a pop-up menu that contains a "terminate" command. In response, processor 115 removes the Notepad window from the display of all workspaces (step 630). Processor 115 also causes the icon representing the Notepad window to be removed from window panel 220 (step 640), and the procedure ends.

Figure 7:
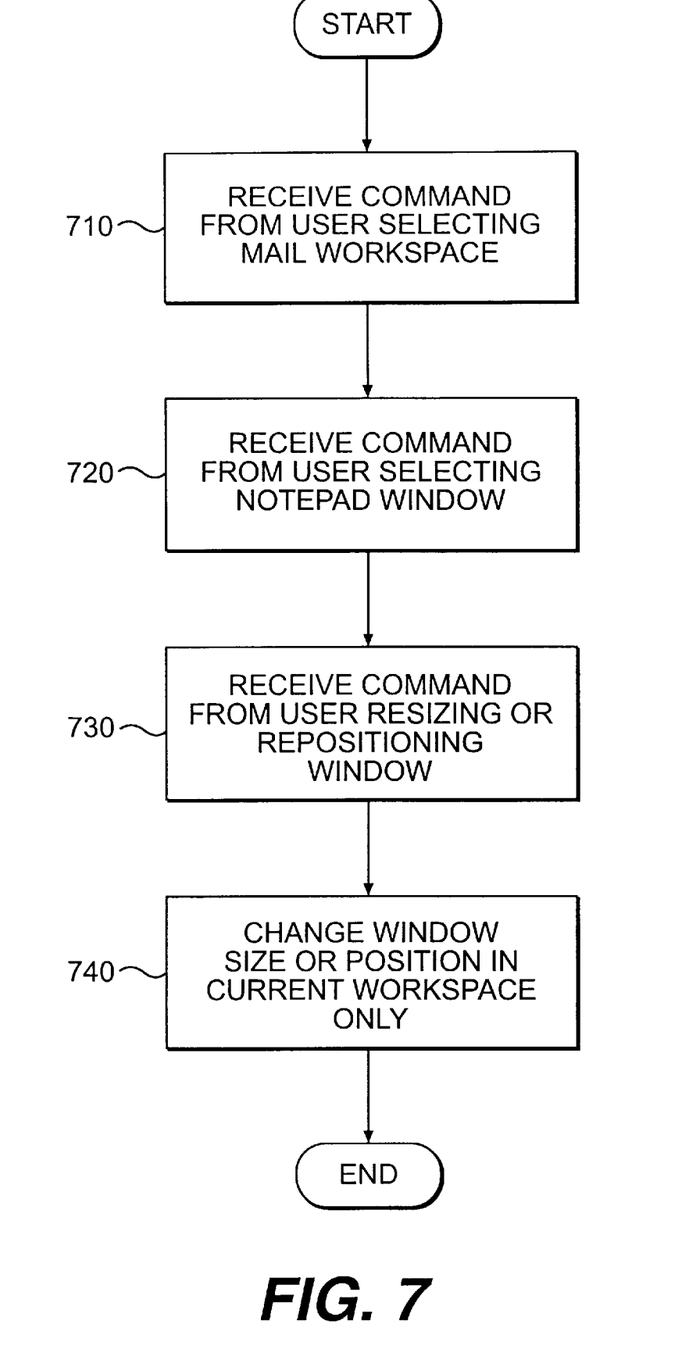
FIG. 7 is a flow diagram of operations performed to reposition or resize a window consistent with the present invention.

FIG. 7 is a flow diagram of steps performed to reposition or resize the Notepad window in the Mail workspace, and assumes that the Notepad window is displayed in both the Mail and Personal Organization workspaces. The procedure begins when system 100 receives a command from the user selecting the Mail workspace, which may be done by using selector 210 (step 710). In response, processor 115 causes to be displayed on screen 140 all windows contained in that workspace. System 100 then receives a command from the user selecting the Notepad window for repositioning or resizing (step 720), which may be done by using mouse 135. System 100 then receives a command from the user to reposition or resize the Notepad window (step 730), again by using mouse 135. In response to the user's actions, processor 115 causes the Notepad window's size or position to change on display screen 140 (step 740), and the procedure ends. Importantly, the user's actions in repositioning or resizing the Notepad window in the Mail workspace does not affect the position or size of the corresponding Notepad window in other workspaces, such as the Personal Organization workspace.

D. Conclusion

As described in detail above, methods and apparatus consistent with the present invention allow a user to easily select and manipulate windows in a user interface that supports multiple workspaces. The foregoing description of an implementation of the invention has been presented for purposes of illustration and description. For example, the described implementation includes software but the present invention may be implemented as a combination of hardware and software or in hardware alone. Modifications and variations are possible to the processes described in connection with FIGS. 3–7 in light of the above teachings or may be acquired from practicing the invention.

Although systems and methods consistent with the present invention are described as operating in the exemplary distributed system and the Java™ programming environment, one skilled in the art will appreciate that the present invention can be practiced in other systems and programming environments. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of RAM or ROM. The scope of the invention is therefore defined by the claims and their equivalents.

What is claimed is:

1. A method for managing the display of windows corresponding to tasks executable by a computer, the method comprising:

providing multiple workspaces, each workspace being capable of displaying multiple windows corresponding to executing tasks;

displaying a window panel including icons corresponding to the executing tasks; and permitting shared access to a window of the executing tasks upon selection of a corresponding icon displayed in the window panel.

2. The method of claim 1, further comprising adding to the window panel an icon for each task opened into a window.

3. The method of claim 1, further comprising:

receiving a command from a user to launch a task; creating a window for the task; and adding an icon representing the window to the window panel.

4. The method of claim 1, further comprising:

receiving a command from a user to hide a window in a selected workspace;

removing the window only from the selected workspace; and maintaining an icon representing the window in the window panel.

5. The method of claim 4, further comprising recording a size and location for the window in the selected workspace.

6. The method of claim 1, further comprising:

receiving a command from a user, in a particular workspace, selecting an icon in the window panel; and displaying in the foreground of the workspace a window corresponding to the selected icon.

7. The method of claim 1, further comprising the steps of:

receiving a command from a user to terminate a window;

removing the window from each workspace in which it is displayed; and deleting from the window panel an icon corresponding to the terminated window.

8. The method of claim 1, further comprising the steps of:

displaying a window in more than one workspace; and resizing the window in one workspace without affecting the size of the window in another workspace.

9. The method of claim 1, further comprising the steps of:

displaying a window in more than one workspace; and repositioning the window in one workspace without affecting the position of the window in another workspace.

10. The method of claim 1, further comprising the steps of:

hiding the window panel behind a workspace switch;

receiving a command from the user selecting the workspace switch; and displaying the window panel in response to the user command selecting the switch.

11. A computer-readable medium containing instructions for managing the display of windows corresponding to tasks executable by a computer, by:

provide multiple workspaces, each workspace being capable of displaying multiple windows corresponding to executing tasks;

displaying a window panel including icons corresponding to the executing tasks; and permitting shared access to a window of the executing tasks upon selection of a corresponding icon displayed in the window panel.

12. The computer-readable medium of claim 11, further comprising adding to the window panel an icon for each task opened into a window.

13. The computer-readable medium of claim 11, further comprising:

receiving a command from a user to launch a task;

creating a window for the task; and adding an icon representing the window to the window panel.

14. The computer-readable medium of claim 11, further comprising:

receiving a command from a user to hide a window in a selected workspace;

removing the window only from the selected workspace; and maintaining an icon representing the window in the window panel.

15. The computer-readable medium of claim 14, further comprising recording a size and location for the window in the selected workspace.

16. The computer-readable medium of claim 11, further comprising:

receiving a command from a user, in a particular workspace, selecting an icon in the window panel; and displaying in the foreground of the workspace a window corresponding to the selected icon.

17. The computer-readable medium of claim 11, further comprising the steps of:

receiving a command from a user to terminate a window;

removing the window from each workspace in which it is displayed; and deleting from the window panel an icon corresponding to the terminated window.

18. The computer-readable medium of claim 11, further comprising the steps of:

displaying a window in more than one workspace; and resizing the window in one workspace without affecting the size of the window in another workspace.

19. The computer-readable medium of claim 11, further comprising the steps of:

displaying a window in more than one workspace; and repositioning the window in one workspace without affecting the position of the window in another workspace.

20. The computer-readable medium of claim 11, further comprising the steps of:

hiding the window panel behind a workspace switch;

receiving a command from the user selecting the workspace switch; and displaying the window panel in response to the user command selecting the switch.

21. An apparatus for managing the display of windows corresponding to tasks executable by a computer, comprising:

a memory having program instructions, and a processor configured to use the program instructions to:

provide multiple workspaces, each workspace being capable of displaying multiple windows corresponding to executing tasks;

display a window panel including icons corresponding to the executing tasks; and permit shared access to a window of the executing tasks upon selection of a corresponding icon displayed in the window panel.

22. The apparatus of claim 21, wherein the processor is further configured to add to the window panel an icon for each task opened into a window.

23. The apparatus of claim 21, wherein the processor is further configured to:

receive a command from a user to launch a task;

create a window for the task; and add an icon representing the window to the window panel.

24. The apparatus of claim 21, wherein the processor is further configured to:

receive a command from a user to hide a window in a selected workspace;

remove the window only from the selected workspace; and maintain an icon representing the window in the window panel.

25. The apparatus of claim 24, wherein the processor is further configured to record a size and location for the window in the selected workspace.

26. The apparatus of claim 21, wherein the processor is further configured to:

receive a command from a user, in a particular workspace, selecting an icon in the window panel; and display in the foreground of the workspace a window corresponding to the selected icon.

27. The apparatus of claim 21, wherein the processor is further configured to:

receive a command from a user to terminate a window;

remove the window from each workspace in which it is displayed; and delete from the window panel an icon corresponding to the terminated window.

28. The apparatus of claim 21, wherein the processor is further configured to:

display a window in more than one workspace; and resize the window in one workspace without affecting the size of the window in another workspace.

29. The apparatus of claim 21, wherein the processor is further configured to:

display a window in more than one workspace; and reposition the window in one workspace without affecting the position of the window in another workspace.

30. The apparatus of claim 21, wherein the processor is further configured to:

hide the window panel behind a workspace switch;

receive a command from the user selecting the workspace switch; and display the window panel in response to the user command selecting the switch.

31. An apparatus for managing the display of windows corresponding to tasks executable by a computer, comprising:

means for providing multiple workspaces, each workspace being capable of displaying multiple windows corresponding to executing tasks;

means for displaying a window panel including icons corresponding to the executing tasks; and means for permitting shared access to a window of the executing tasks upon selection of a corresponding icon displayed in the window panel.

32. The apparatus of claim 31, further comprising means for adding to the window panel an icon for each task opened into a window.

33. The apparatus of claim 31, further comprising:

means for receiving a command from a user to launch a task;

means for creating a window for the task; and means for adding an icon representing the window to the window panel.

34. A method for managing the display of windows corresponding to tasks executable by a computer, the method comprising:

providing multiple workspaces, each workspace being capable of displaying multiple windows corresponding to executing tasks;

displaying a first window panel including first icons corresponding to executing workspaces;

displaying a first workspace, the first workspace displaying at least one first workspace window corresponding to an executing task associated with at least the first workspace; and displaying, simultaneously with the first window panel, said first workspace and said first workspace window, a second window panel including second icons corresponding to said executing tasks.

35. The method of claim 34, further including the steps of:

receiving a command from a user selecting a particular second icon in the second window panel, the particular second icon reflecting a task executed in both said first and second workspaces; and displaying in the foreground of the first workspace, a window corresponding to the task reflected by the particular second icon.

36. The method of claim 34, wherein displaying a first workspace includes the step of:

receiving a command from a user selecting a particular first icon in the first window panel, said particular first icon corresponding to said first workspace.

37. The method of claim 35, further including the steps of:

displaying a third window panel including icons corresponding to non-executing tasks and icons corresponding to said executing tasks;

receiving a second command from a user selecting an icon corresponding to a first non-executing task;

initiating execution of the first non-executing task;

generating a window corresponding to the first non-executing task, the generated window representing the execution of the first non-executing task; and displaying the generated window in said first workspace.

38. A system for managing the display of windows corresponding to tasks executable by a computer, the system comprising:

means for providing multiple workspaces, each workspace being capable of displaying multiple windows corresponding to executing tasks;

means for displaying a first window panel including first icons corresponding to executing workspaces;

means for displaying a first workspace, means for displaying within the first workspace at least one first workspace window corresponding to an executing task associated with at least the first workspace; and means for displaying, simultaneously with the first window panel, said first workspace and said first workspace window, a second window panel including second icons corresponding to said executing tasks.

39. The system of claim 38, further comprising:

means for receiving a command from a user selecting a particular second icon in the second window panel, the particular second icon reflecting a task executed in both said first and second workspaces; and means for displaying in the foreground of the first workspace, a window corresponding to the task reflected by the particular second icon.

40. The method of claim 38, wherein the means for displaying a first workspace further comprises:

means for receiving a command from a user selecting a particular first icon in the first window panel, said particular first icon corresponding to said first workspace.

41. The system of claim 39, further comprising:

means for displaying a third window panel including icons corresponding to non-executing tasks and icons corresponding to said executing tasks;

means for receiving a second command from a user selecting an icon corresponding to a first non-executing task;

means for initiating execution of the first non-executing task;

means for generating a window corresponding to the first non-executing task, the generated window representing the execution of the first non-executing task; and means for displaying the generated window in said first workspace.

42. A method for managing the display of windows corresponding to tasks executable by a computer, the method comprising:

providing multiple workspaces, each workspace capable of displaying multiple windows corresponding to multiple executing tasks;

providing a first window panel including icons representing executing workspaces;

providing a second window panel including icons representing executing tasks corresponding to the executing workspaces;

displaying in a display area, the first window panel, second window panel, an active workspace, and at least one window representing an executing task within the active workspace;

receiving a command from a user to launch a task;

creating a new window for the task; and adding an icon representing the created window to the second window panel.

43. The method of claim 42, wherein the first window panel includes a highlighted icon representing the active workspace displayed in the display area, and the second window panel includes one or more icons representing executing tasks, including executing tasks not associated with the active workspace.

44. The method of claim 43, wherein the second window panel is a sliding window panel.

45. The method of claim 43, wherein the display area includes a third window panel including icons representing non-executing tasks.

46. The method of claim 45, including the steps:

selecting a third window panel icon representing a first non-executing task;

initiating execution of the first non-executing task represented by the third window panel icon, wherein the first non-executing task is transformed into a first executing task;

creating a new window in the active workspace, the new window representing the first executing task; and creating a first executing task icon in the second window panel.

47. The method of claim 43, including the steps:

receiving a command to terminate an executing task represented by an executing task window in the first active workspace;

terminating the execution of the executing task;

removing the executing task window from the active workspace; and removing an icon representing the terminated executing task, from the second window panel.

* * * * *